United States Patent [19]

Wich

[11] 4,421,029
[45] Dec. 20, 1983

[54] SUPPLY CIRCUIT FOR A LOAD WHICH IS TO BE CONTINUALLY SUPPLIED WITHIN A PROJECTILE

[75] Inventor: Harald Wich, Schwaig, Fed. Rep. of Germany

[73] Assignee: Diehl GmbH & Co., Nuremberg, Fed. Rep. of Germany

[21] Appl. No.: 287,473

[22] Filed: Jul. 27, 1981

[30] Foreign Application Priority Data

Aug. 2, 1980 [DE] Fed. Rep. of Germany ........ 3029491

[51] Int. Cl.³ .............................................. F42C 11/00
[52] U.S. Cl. .................................................... 102/207
[58] Field of Search ................ 102/207, 208, 209, 210

[56] References Cited

U.S. PATENT DOCUMENTS

| | | | |
|---|---|---|---|
| 3,393,640 | 7/1968 | Harnau ................................ | 102/209 |
| 3,670,653 | 6/1972 | Lunt et al. ......................... | 102/210 |
| 3,946,674 | 3/1976 | Pettersson et al. ................. | 102/207 |
| 3,958,510 | 5/1976 | Stutzle ............................... | 102/209 |
| 4,119,038 | 10/1978 | Allen et al. ......................... | 102/207 |

FOREIGN PATENT DOCUMENTS

| | | |
|---|---|---|
| 1638178 | 3/1971 | Fed. Rep. of Germany . |
| 2434700 | 2/1975 | Fed. Rep. of Germany . |
| 2539541 | 3/1977 | Fed. Rep. of Germany . |
| 2838055 | 3/1979 | Fed. Rep. of Germany . |

*Primary Examiner*—Charles T. Jordan
*Attorney, Agent, or Firm*—Scully, Scott, Murphy & Presser

[57] ABSTRACT

A supply circuit for a load which is to be continually supplied within a projectile, with a generator connected ahead of a voltage generator, in particular a thermogenerator, which provides a power output which increases to a maximum within a first supply stage of the load and drops off in a contiguous second supply phase of the load, whereby during the first and second supply phases the provided power output is greater than the power required for the operation of the load. The load and an RC-charging circuit with a storage condenser are located in parallel at the voltage generator output so that during the first supply phase of the load there will charge the storage condenser wherein a diode is connected into the RC-charging circuit so as to prevent the discharge of the storage condenser during the second supply phase, and in which a switch controlled by the output voltage of the voltage generator is connected between the storage condenser and the load, which is blocked during the first supply phase and which is actuated as soon as the output voltage of the voltage generator has reached a value in which is insufficient for the operation of the load, whereby in a third supply phase the load is supplied through the switch from the storage condenser.

4 Claims, 4 Drawing Figures

SUPPLY CIRCUIT FOR A LOAD WHICH IS TO BE CONTINUALLY SUPPLIED WITHIN A PROJECTILE

BACKGROUND OF THE INVENTION

1. Field of the Invention

The present invention relates to a supply circuit for a load which is to be continually supplied within a projectile, with a generator connected ahead of a voltage generator, in particular a thermo-generator, which provides a power output which increases to a maximum within a first supply stage of the load and drops off in a contiguous second supply phase of the load, whereby during the first and second supply phases the provided power output is greater than the power required for the operation of the load.

2. Discussion of the Prior Art

In predetermined types of projectiles there are provided electronic circuits (loads) which must be continually supplied during flight. Such circuits differ in construction and function from ignition circuits which are supplied for short periods of time from a generator, for example, a piezo-generator. For the continual supply of a load circuit, batteries are frequently utilized.

Described in German Laid-open Patent Application No. 24 34 700 is a projectile which includes a pyrotechnic radiation source which is active during flight, and which emits a target tracking beam. The radiation source is concurrently utilized for the operation of a thermo-generator.

Described in German Patent Application No. P 30 03 633.0 is a thermo-electric generator which is operated by temperature decreases encountered under flight conditions. In a generator of that type the delivered power increases steeply at the beginning of the flight trajectory and then drops off gradually. The generator is to be dimensioned so that even towards the end of the flight there stands available power which is sufficient for the operation of the load. In contrast therewith, the power which is generated at the beginning of the flight is substantially larger than required for the operation of the load. This excess power output is not utilized, however, it results in a significant increase in requirement for constructional components.

Similar are the relationships in generators which are operated under the utilization of the mass moment of inertia due to the spin of the projectile.

Similar are also the above-mentioned relationships in piezo-electric generators which make use of the dynamic pressure of the projectile.

SUMMARY OF THE INVENTION

Accordingly, it is an object of the present invention to provide a circuit of the above-mentioned type in which the dimensioning of the generator is not determined by its power output towards the end of the flight of the projectile.

The above-mentioned object is inventively achieved in that the load and an RC-charging circuit with a storage condenser are located in parallel at the voltage generator output so that during the first supply phase of the load there will charge the storage condenser wherein a diode is connected into the RC-charging circuit so as to prevent the discharge of the storage condenser during the second supply phase, and in which a switch controlled by the output voltage of the voltage generator is connected between the storage condenser and the load, which is blocked during the first supply phase and which is actuated as soon as the output voltage of the voltage generator has reached a value in which is insufficient for the operation of the load, whereby in a third supply phase the load is supplied through the switch from the storage condenser.

By means of the invention, a portion of the power which is initially produced by the generator, and which exceeds the power requirement of the load, is assumed by the storage condenser. The power which is stored in the condenser is then released for the further operation of the load only when the latter can no longer be operated from the generator itself. Thereby the generator need no longer be dimensioned so large that it still must supply the load towards the end of the flight of the projectile, inasmuch as towards the end of the flight of the projectile the supply is effected from the storage condenser. The generator can also be so designed that it already operates with a substantially reduced power output prior to the end of the flight of projectile, or will then provide no power. This significantly simplifies the construction of the generator and renders possible the utilization of a generator having a smaller constructional size.

The invention is, above all, to be utilized when a thermo-generator, a spin-excited generator or a piezo-generator delivers the power.

In a further embodiment of the invention, a diode is connected ahead of the load so as to prevent, in the third supply phase a discharge of the storage condenser towards the voltage generator. This will ensure that the power or energy which is held in readiness within the storage condenser will flow only towards the load.

BRIEF DESCRIPTION OF THE DRAWINGS

Reference may now be had to the following detailed description of preferred embodiments of the invention, taken in conjunction with the accompanying drawings; in which.

DETAILED DESCRIPTION

The supply circuit includes a thermo-generator 1 which utilizes a temperature differential existing between a heat source and a heat sink. In a projectile the power output is effected pursuant to typical curve illustrated in the graph of FIG. 1. After the firing of the projectile, the power output rises steeply up to a time point t2 and then drops off gradually. From a time point t1 up to a time point t3 the provided power is greater than the power PL necessary for the operation of a load 2. Between the time points t1 and t3 there is thus available an excess power output Pu.

Connected to the output of the thermo-generator 1 is a usual single-pulse generator 3. This operates with a primary winding W1, a secondary winding W2, and a control winding W3. Connected in series with the primary winding W1 is the collector-emitter section of a transistor T1 whose base is connected through the control winding W3 to a voltage divider formed of resistors R1 and R2. Provided in parallel with the resistor R2 is a condenser C1. Located in the secondary circuit is a rectifier diode D1 and a filter condenser C2.

Figure 1:
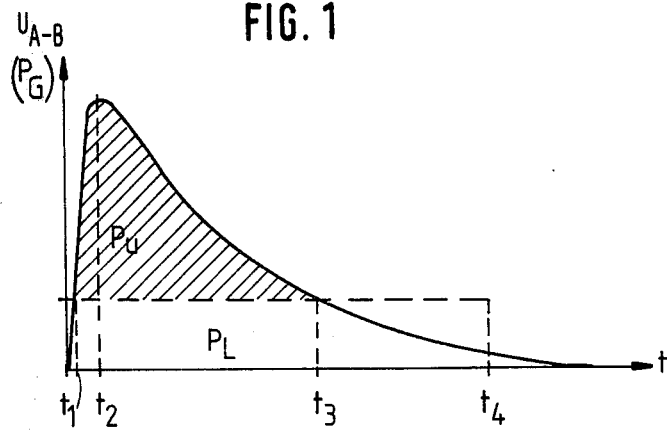
FIG. 1 illustrates a typical power output graph for a thermo-generator.
Figure 2:
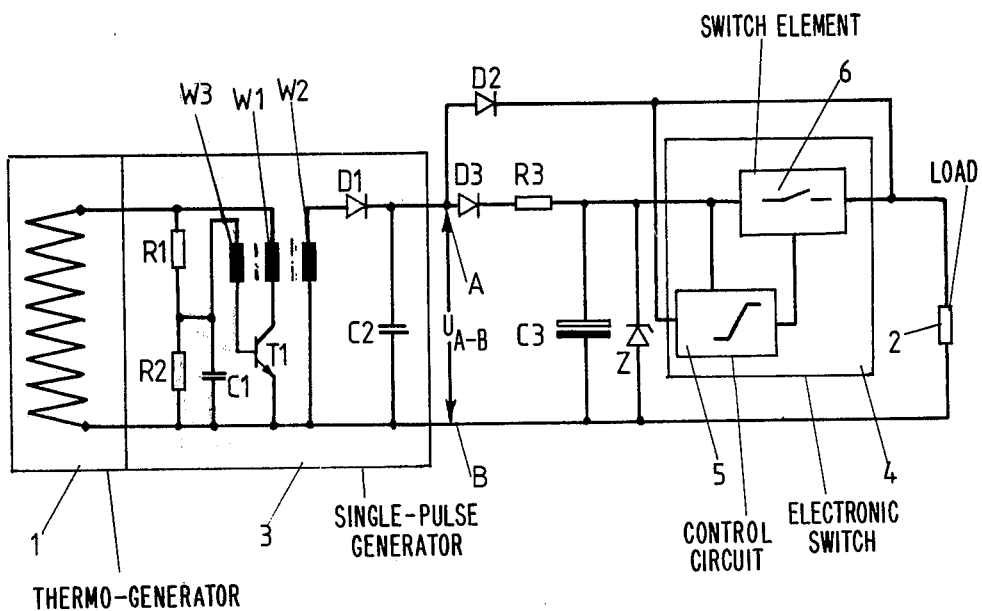
FIG. 2 illustrates a block circuit diagram for a supply circuit.

Present at the output A and B of the generator 3 is a voltage whose cycle essentially superimposes itself with the cycle of the power (refer to FIG. 1).

The load 2 is connected to the output A and B of the generator 3 through a diode D2, which load is in practice an electronic circuit. Moreover, connected to the output A and B through a diode D3 is a RC-charging circuit consisting of a storage condenser C3 and a charging resistor R3. Located in parallel with the storage condenser C3 is a Zener diode Z which serves for the protection of the circuit from overvoltages.

Connected between the voltage pole of the condenser C3 and the load 2 is an electronic switch 4 which is controlled by the output voltage at the generator output A. The switch 4 encompasses a control circuit 5 and the actual switch element 6.

Figure 3:
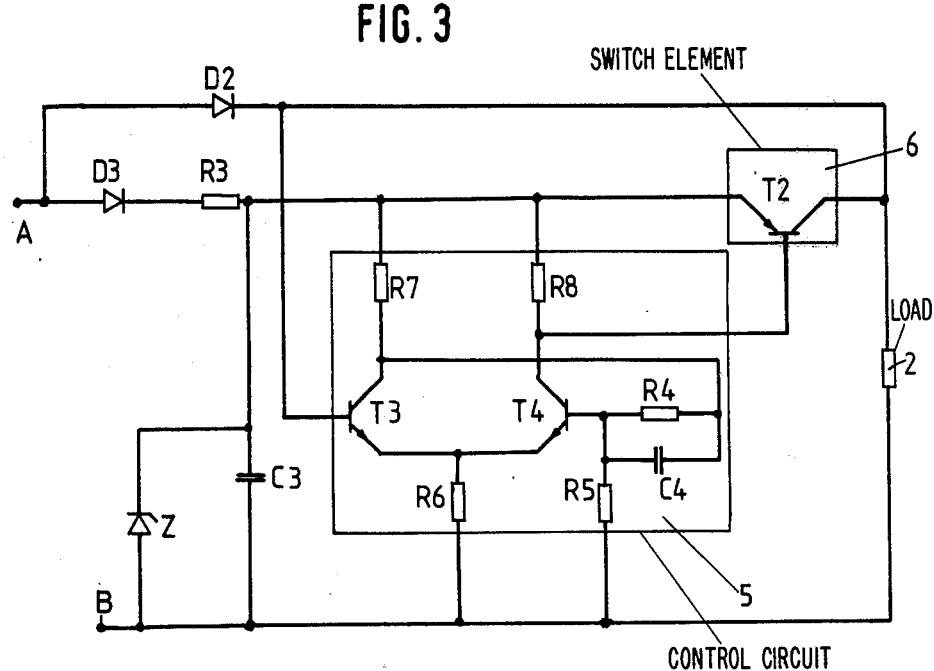
FIGS. 3 and 4, respectively, illustrate block diagrams of exemplary embodiments for a controlled switch in the supply circuit of FIG. 2.

In the embodiment pursuant to FIG. 3 the switch element 6 is formed by a pnp-transistor T2 in the base circuit. The control circuit 5 incorporates two npn-transistors T3 and T4 in the emitter circuit. The base of the transistor T3 is located behind the diode D2 at the output voltage. The collector has connected thereto, through a parallel circuit of a resistor R4 and a condenser C4, the base of the transistor T4. Moreover, connected to the base of the transistor T4 is also a base resistor R5. The emitters of the transistors T3 and T4 are located through a resistor R6 at the zero point B of the circuit. Connected to the collector of the transistor T4 is the base of the transistor T2. Collector resistors of the transistors T3 and T4 are designated by reference numerals R7 and R8.

In order to reduce the current requirement of the control circuit 5, in lieu of npn-transistors T3 and T4 there can be provided field-effect transistors.

Figure 4:
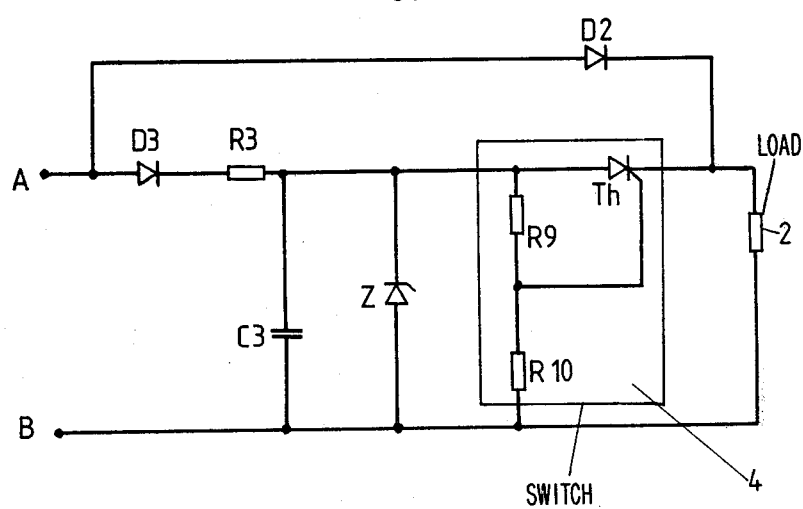

An exemplary embodiment of the switch 4 which is simplified with respect to circuit requirements is illustrated in FIG. 4. In lieu of the transistor T2 there is utilized a thyristor Th whose control electrode is connected to a voltage divider formed of resistors R9 and R10 in parallel with the storage condenser C3.

The mode of operation of the described supply circuit is generally as follows:

The output voltage of the transformer 3 rises steeply up to the time point t2. Until then the storage condenser C3 is charged through the diode D3 and the resistor R3. Concurrently, the load 2 is operated through the diode D2. The transistor T2, or the thyristor Th is blocked.

From the time point t2 on the output voltage of the generator 3 drops off. The load 2 is further operated through the diode D2. The diode D3 prevents a discharge of the condenser C3, which thus maintains its charged condition reached up to the time point t2. The transistor T2, or the thyristor Th, is further blocked. After a predetermined time interval, there is reached an output voltage at time point t3, which is no longer adequate for the operation of the load 2. The transistor T2, or thyristor Th, is then actuated. In the circuit pursuant to FIG. 3 this is effected in that the transistor T3 will block due to reduced output voltage at the base and the charge voltage present at the collector of the condenser C3, so that the transistor T4 will become conductive. In the circuit pursuant to FIG. 4 the thyristor Th is ignited at time point t3.

Commencing from the time point t3, the storage condensor C3 is connected through the transistor T2, or the thyristor Th, to the load 2. This load is now supplied by the storage condenser C3 independently of the small, still present output voltage of the generator 3. Only when the condenser C3 is discharged is an operation of the load 2 no longer possible (refer to t4 in FIG. 1).

Thereby there can be extended the possible operating time period of the load 2 beyond the time point t3 in that, at an early timepoint wherein excess power stands available, this is stored in the interim and only after the dropping off of the instantaneous generator power to an inadequate value, is delivered to the load. In order to avoid a voltage breakdown at the load 2 at time point t3, the circuit 4 is preferably so adjusted that the switch element 6 is actuated when the output voltage of the generator 3 is still just sufficient for the operation of the load 2.

The switch element T3, T4, R6, R7, and R8 or R9 and R10, lead to a predetermined current usage which must be covered by the storage condenser C3 therefore, preferably there are utilized field-effect transistors, and the resistors are designed as high-omic as possible. The diode D2 prevents that the condenser C3 will discharge through the generator 3 after the actuation of the switch.

I claim:

1. In a supply circuit for a load to be continually supplied in a projectile, including a generator, particularly a thermo-generator connected ahead of a voltage generator, which provides a power output which rises to a maximum in a first phase of the load and drops off in a second contiguous phase of the load, wherein during the first and the second supply phase the power provided is greater than the power required for the operation of the load; the improvement comprising: said load and an RC-charging circuit having a storage condenser connected in parallel with said voltage generator output so as to charge the storage condenser during the first supply phase; a diode connected in said RC-charging circuit so as to prevent a discharge of said storage condenser during the second supply phase; and a switch controlled by the output voltage of the voltage generator being connected between the storage condenser and the load, said switch being blocked during the first and the second supply phase and being actuated upon the output voltage of the voltage generator having reached a value insufficient for the operation of the load whereby in a contiguous third supply phase the load is supplied through said switch from said storage condenser.

2. Supply circuit as claimed in claim 1, comprising a diode connected ahead of said load, said diode preventing a discharge of the storage condenser to said voltage generator during the third supply phase.

3. Supply circuit as claimed in claim 1 or 2, said switch comprising a thyristor having a control electrode connected at a pickup of a voltage divider parallel to said storage condenser.

4. Supply circuit as claimed in claim 1 or 2, said switch comprising a switching transistor controlled by a sweep circuit connected to the output voltage of said voltage generator and to said storage condenser.

* * * * *